United States Patent
Mansi et al.

(10) Patent No.: US 9,111,123 B2
(45) Date of Patent: Aug. 18, 2015

(54) FIRMWARE FOR PROTECTING DATA FROM SOFTWARE THREATS

(71) Applicant: International Business Machines Corporation, Armonk, NY (US)

(72) Inventors: Felice Mansi, Andria (IT); Michele Paradiso, Via Triggiano (IT); Valerio Summo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/930,386

(22) Filed: Jun. 28, 2013

(65) Prior Publication Data
US 2015/0006912 A1 Jan. 1, 2015

(51) Int. Cl.
| | | |
|---|---|---|
| G06F 11/30 | (2006.01) | |
| G06F 21/84 | (2013.01) | |
| G06F 21/62 | (2013.01) | |
| H04L 29/06 | (2006.01) | |
| H04L 9/08 | (2006.01) | |

(52) U.S. Cl.
CPC ............ *G06F 21/84* (2013.01); *G06F 21/6209* (2013.01); *H04L 9/0822* (2013.01); *H04L 29/06673* (2013.01); *H04L 63/0442* (2013.01)

(58) Field of Classification Search
CPC ... G06F 21/6209; G06F 21/84; H04L 9/0822; H04L 29/06673; H04L 63/0442
USPC .......................................................... 713/193
See application file for complete search history.

(56) References Cited

U.S. PATENT DOCUMENTS

| | | | |
|---|---|---|---|
| 5,978,482 A * | 11/1999 | Dwork et al. .................... 705/51 |
| 6,779,115 B1 | 8/2004 | Naim | |
| 6,922,693 B1 | 7/2005 | Rubin et al. | |
| 7,206,943 B2 | 4/2007 | Kobayashi et al. | |
| RE40,702 E | 4/2009 | Pizano et al. | |
| 7,657,759 B2 | 2/2010 | Rubin et al. | |
| 8,155,314 B2 | 4/2012 | Evans et al. | |
| 2002/0019939 A1 | 2/2002 | Yamamoto et al. | |
| 2002/0129261 A1 | 9/2002 | Cromer et al. | |
| 2003/0046539 A1 * | 3/2003 | Negawa ......................... 713/163 |
| 2003/0165240 A1 | 9/2003 | Bantz et al. | |
| 2003/0208753 A1 | 11/2003 | Corrigan et al. | |
| 2006/0165232 A1 | 7/2006 | Burazerovic et al. | |

(Continued)

FOREIGN PATENT DOCUMENTS

| | | |
|---|---|---|
| EP | 1343321 B1 | 9/2003 |
| WO | 2010071947 A1 | 7/2010 |
| WO | 2012094196 A3 | 7/2012 |

OTHER PUBLICATIONS

Cook et al.; "Remotely Keyed Cryptographics Secure Remote Display Access Using (Mostly) Untrusted Hardware"; Department of Computer Science; Columbia University; New York, NY.

(Continued)

*Primary Examiner* — Krisna Lim
(74) *Attorney, Agent, or Firm* — Alexander Jochym; Nicholas Cadmus

(57) ABSTRACT

In a method for protecting data, an electronic card device receives encrypted data, the data encrypted using a valid encryption key. The electronic card device stores the encrypted data in a first memory. The electronic card device decrypts the encrypted data using a decryption key. The electronic card device stores the decrypted data in a second memory.

11 Claims, 3 Drawing Sheets

(56) References Cited

U.S. PATENT DOCUMENTS

2007/0061873 A1\* 3/2007 Shewchuk et al. .............. 726/10
2008/0028204 A1\* 1/2008 Masuhiro et al. ............. 713/152

OTHER PUBLICATIONS

Lee et al.; "A Key-Code Watermarking Algorithm for Video Content Protection"; pp. 702-706, IEEE; Copyright 2010 IEEE.
Zhang et al.; "The Development of a Portable Hard Disk Encryption/Decryption System with a MEMS Coded Lock"; Sensors 2009; vol. 9; ISSN 1424-8220; Published Nov. 19, 2009; pp. 9300-9331; <www.mdpi.com/journal/sensors>.
Techsmith, "Screen Recording & Video Editing Software", retrieved on Apr. 8, 2013 from website: <http://www.techsmith.com/camtasia.html>.
Prior Art Database, "Mobile phone and one time encryption keys to prevent key logging and screen scraping on public computers", Feb. 18, 2009; <http://www.ip.com>.
Fisher, "Uncategorized: On Windows Vista, DRM, and new monitors", Aug. 21, 2005, retrieved from website: <http://artstechnica.com/uncategorized/2005/08/hdcp-vista/>, copyright 2013 Conde Nast.

\* cited by examiner

FIRMWARE FOR PROTECTING DATA FROM SOFTWARE THREATS

FIELD OF THE INVENTION

The present invention relates generally to asymmetric key cryptography, and more particularly to firmware decryption for protecting data from software threats.

BACKGROUND OF THE INVENTION

Interactions with computers and hence the Internet rely heavily on the input and output devices of a computer, namely the keyboard, mouse, and display. A majority of these interactions are driven by the information presented to a user on the display. The content and source of this information is usually processed and taken for granted by a user, increasingly leading to phishing, spoofing, and other visually-based attacks. These attacks are successful because the information displayed is what is expected to the user. As attackers become savvier, users may find it increasingly difficult to determine the integrity of visual information presented to them. Not only is it difficult for the user to determine the integrity of the presented information, but it is also becoming increasingly difficult for users to guarantee the integrity of computer systems. Consequently, users can have little confidence in the confidentiality of data, particularly when using remote internetworked applications such as web banking.

Spyware is software that aids in gathering information about a person or organization without his or her knowledge and sends such information to another entity without the user's consent, or asserts control over a computer without knowledge. Spyware is typically classified into four types: system monitors, trojans, adware, and tracking cookies. Spyware is mostly used for purposes such as tracking and storing internet users' movements on the web, and serving up pop-up ads to internet users. Whenever spyware is used for malicious purposes, its presence is typically hidden from the user and can be difficult to detect. Some spyware may be installed by the owner of a shared, corporate, or public computer intentionally in order to monitor users. While the term "spyware" suggests software monitoring a user's computer usage, the functions of spyware can extend beyond simple monitoring.

A commonly used method of encryption for online communications is asymmetric encryption. Encryption key encryption is a type of asymmetric encryption where a party has a pair of keys. One key is a encryption key, which can be made freely available to the public. The other key, carefully guarded by the party, is a private key. A message encoded with a encryption key can only be decoded using the corresponding private key, and vice versa. RSA (Rivest-Shamir-Adleman) is a commonly used asymmetric key algorithm. In symmetric encryption, the sender and the recipient use the same key to encrypt and decrypt the message. For example, the Advanced Encryption Standard (AES) is a widely used symmetric key algorithm. AES is a cipher with a 128 bit block size and it uses keys of 128, 192 or 256 bits.

SUMMARY

Aspects of an embodiment of the present invention disclose a method, computer program product, and system for protecting data. The method includes an electronic card device receiving encrypted data, the data encrypted using a valid encryption key. The electronic card device storing the encrypted data in the first memory. The electronic card device decrypting the encrypted data using a decryption key. The electronic card device storing the decrypted data in the second memory.

DETAILED DESCRIPTION

Figure 1:
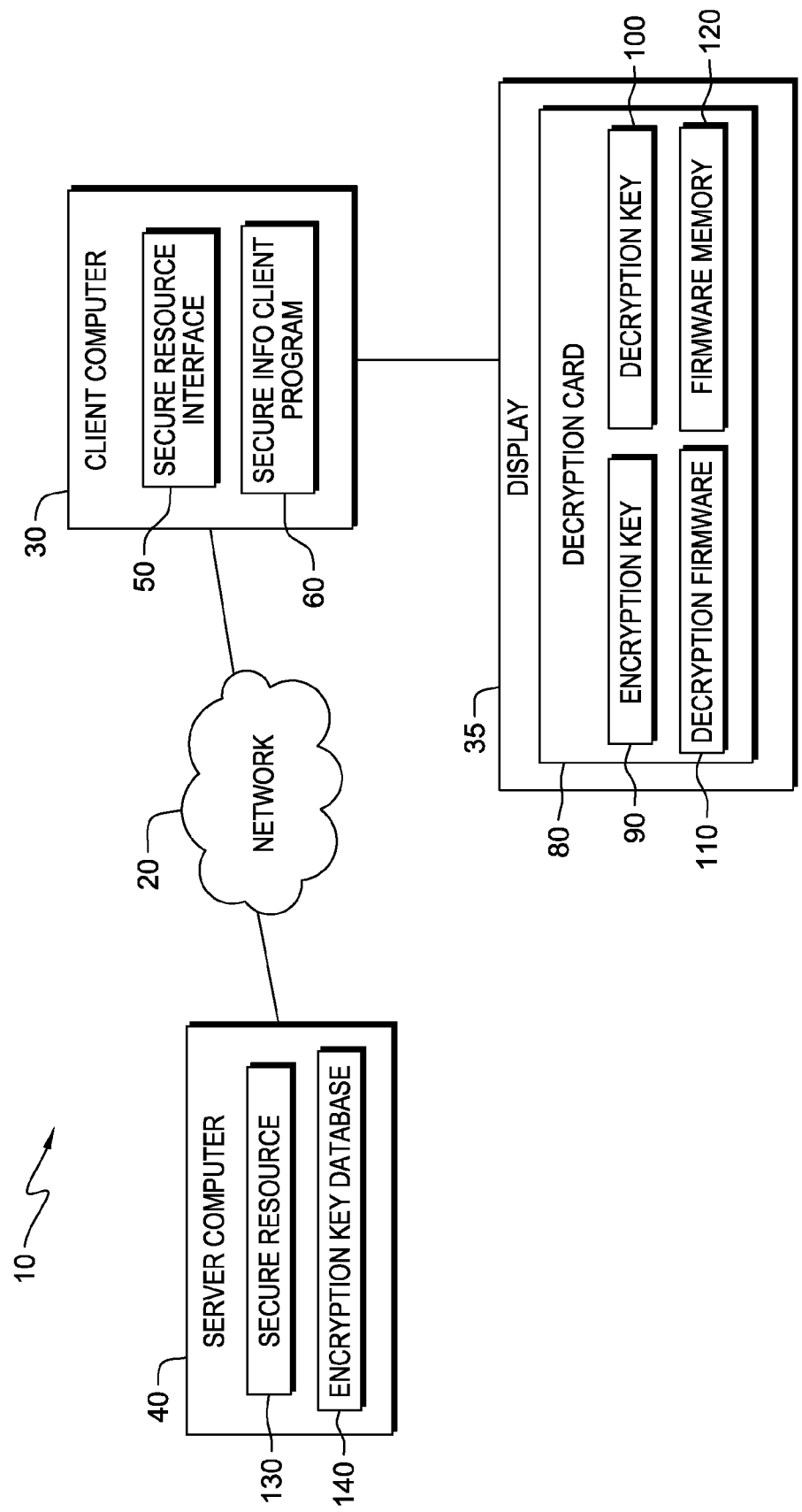
FIG. 1 is a functional block diagram illustrating a distributed data processing environment, in accordance with an embodiment of the present invention.

Encryption-based spyware protection is used to make sensitive encrypted data difficult to decipher. The data is decoded before it is displayed on the display. Embodiments of the present invention recognize encryption-based spyware protection is software based. If the spyware is installed as part of the operating system it may also intercept the decrypted data sent to the display. Embodiments of the present invention utilize firmware-based decryption at the display of the computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

Distributed data processing environment 10 includes client computer 30, connected to display 35, and server computer 40, interconnected over network 20. Network 20 may be a local area network (LAN), a wide area network (WAN) such as the Internet, a combination of the two or any combination of connections and protocols that will support communications between client computer 30 and server computer 40, in accordance with embodiments of the invention. Network 20 may include wired, wireless, or fiber optic connections. Distributed data processing environment 10 may include additional server computers, client computers, or other devices not shown.

Client computer 30 may be a desktop computer, a laptop computer, a tablet computer, a personal digital assistant (PDA), or a smart phone. In general, client computer 30 may be any electronic device or computing system capable of sending and receiving data, and communicating with server computer 40 over network 20, in accordance with embodiments of the invention.

In an exemplary embodiment, client computer 30 includes secure resource interface 50 and secure info client program 60. Secure resource interface 50 operates to allow a user to interact with local and remote programs accessible to client computer 30. In one embodiment, secure resource interface 50 provides an interactive interface and displays local and remote programs accessible to client computer 30 on display 35. Secure resource interface program 50 may be, for example, a graphical user interface (GUI) or a web user interface (WUI) and can display text, documents, web browser windows, user options, application interfaces and instructions for operation. In other embodiments, secure resource interface program 50 may comprise one or more interfaces such as an operating system interface and/or application interfaces.

The user, using secure resource interface 50, may also interact with secure info client program 60. In one embodiment, secure info client program 60 is a program receiving data from the user. For example, secure info client program 60 can receive a userid and password from a user operating client computer 30, using secure resource interface 50, attempting to access an e-mail account on a website. In another embodiment, secure info client program 60 is a program sending data over network 20 to a remote server. For example, the user at client computer 30, using secure resource interface 50, may enter a userid and password for a secure e-mail account at secure info client program 60. Secure info client program 60 then sends the userid and password to a remote server hosting the e-mail account.

Server computer 40 operates generally to host secure resource 130 accessible by client computer 30 over network 20. Server computer 40 may be a management server, a web server, or any other electronic device or computing system capable of receiving and sending data. In other embodiments, server computer 40 may represent a server computing system utilizing multiple computers as a server system, such as in a cloud computing environment.

In an exemplary embodiment, server computer 40 contains secure resource 130 and encryption key database 140. Secure resource 130 may be a website, a database, a data structure, or any computer resource or device that requires user authentication to access. In the depicted embodiment, secure resource 130 resides on server computer 40. In other embodiments, secure resource 130 may reside on another server or another computing device within environment 10, provided that secure resource 130 is accessible to secure info client program 60 via network 20. In one embodiment, secure resource 130 receives data, for example, a userid and password, from secure info client program 60.

Encryption key database 140 is a repository that may be written and read by software on server computer 40 and is accessible to secure resource 130. In one embodiment, encryption key database 140 is located on computer server 40. In other embodiments, encryption key database 140 may be located on another system or another computing device within environment 10, provided that encryption key database 140 is accessible to secure resource 130 via network 20. In one embodiment, encryption key database 140 is a database that stores information identifying encryption keys, which will be described in further detail below.

Display 35 is an electronic visual display directly connected to, or included within, client computer 30. In the depicted embodiment, display 35 is connected to client computer 35 by a display channel, for example, a high definition multimedia interface (HDMI) cable, which transmits data for display on display 35. Display 35 comprises the display device and circuitry. Display 35 may be a thin film transistor liquid crystal display (TFT-LCD) thin panel, cathode ray tube (CRT), or any other type of monitor capable of displaying data from client computer 30.

In an exemplary embodiment, display 35 includes decryption card 80. In embodiments of the invention, decryption card 80 operates generally to receive encrypted data from secure resource 130 and decrypt the encrypted data for display on display 35 and storage on decryption card 80. In the depicted embodiment, decryption card 80 is an electronic card device that may be inserted into a slot "common interface" located on display 35. Decryption card 80 may be a computing device capable of sending and receiving data, decrypting encrypted data and storing data. A slot common interface may be a physical or electrical specification on display 35 into which decryption card 80 can fit and can be accessed by the programs on client computer 30. For example, the slot common interface may be a USB port, and the decryption card may be similar in specification to a "Universal Serial Bus" (USB) drive.

In one embodiment, decryption card 80 is capable of sending and receiving data when it is connected to a network via a computing system. For example, when decryption card 80 is inserted into display 35, the card may send and receive data over network 20 via client computer 30. In the depicted embodiment, decryption card 80 is capable of communicating with programs operating on client computer 30 and server computer 40 over network 20. Decryption card 80 operates from within display 35 and a part of the memory stored on decryption card 80 cannot be accessed by software installed on client computer 30, and also cannot be accessed by spyware and/or malware that may exist on client computer 30, which will be described in more detail below.

In an exemplary embodiment, decryption card 80 includes encryption key 90, decryption key 100, decryption firmware 110, and firmware memory 120.

Encryption key 90 is one half of an asymmetric key cryptography pair comprising encryption key 90 and decryption key 100, and may be used to encrypt data. Encrypted data may be any data on a computing device, particularly any data identifying a user or other confidential information.

In one embodiment, when the user installs decryption card 80, encryption key 90 may be downloaded from a manufacturer's website. For example, the user downloads encryption key 90 from the server hosting the manufacturer's website (not shown). In the depicted embodiment, encryption key 90 is downloaded to decryption card 80 when decryption card 80 is inserted. Alternatively, encryption key 90 may be downloaded to server computer 40 when decryption card 80 is installed.

Secure resource 130 receives encryption key 90, and, using encryption key 90, encrypts data. In one embodiment, secure resource 130 sends the encrypted data over network 20 to secure info client program 60.

Each decryption card is associated with a unique encryption key used to identify the decryption card. In addition, each encryption key is associated with one decryption card. If a card is lost or stolen, it can be reported and the functionality of the card invalidated. In one embodiment, if a user reports a decryption card as lost or stolen, the information identifying the encryption key associated with the decryption card, for example, the identification number, is removed from encryption key database 140 by the manufacturer responsible for making and distributing decryption card 80 and encryption key 90. When the information used to identify a encryption key is removed from encryption key database 140, the associated decryption card is considered to be "black listed". If secure resource 130 receives an encryption key associated with a black listed card, access to secure resource 130 is denied.

Decryption key 100 is used for decrypting data encrypted by encryption key 90. Each decryption card is associated with one encryption key, and data encrypted by the encryption key can only be decrypted by its associated decryption key. For example, data encrypted by encryption key 90 can only be decrypted by decryption key 100. In one embodiment, the asymmetric key cryptography pair comprising encryption key 90 and decryption key 100 uses the Institute of Electrical and Electronics Engineers (IEEE) P1363 standard for public-key cryptography, to encrypt confidential data. One skilled in the art will appreciate that IEEE P1363 includes specifications for traditional, lattice-based, password-based, and identity-based encryption key cryptography. In another embodiment, the asymmetric key cryptography pair comprising encryption key 90 and decryption key 100 uses discrete logarithms to encrypt confidential data. In yet another embodiment, another mathematical relationship is used.

Decryption firmware 110 operates as the control program for decryption card 80. In one embodiment, decryption firmware 110 receives data encrypted by encryption key 90 over the network from secure resource 130. In another embodiment, secure info client program 60 receives decrypted data over the network from secure resource 130 and sends the encrypted data to decryption firmware 110. Decryption firmware 110 receives the decrypted data via the display channel connecting client computer 30 and display 35 from secure info client program 60. Decryption firmware 110 uses decryption key 100 to decrypt the encrypted data. In one embodiment, decryption firmware 110 displays the decrypted data on display 35. In another embodiment, decryption firmware 110 sends the decrypted data to firmware memory 120 for temporary or permanent storage.

Firmware memory 120 is an electronic component of decryption card 80 that can be used to store data on a temporary or permanent basis. In an exemplary embodiment, firmware memory 120 is comprised of two parts (not shown): the first memory, accessible by client computer 30, is dedicated to storing encrypted data received from secure resource 130 before it is decrypted. The first memory of firmware memory 120 may be accessed by software residing on client computer 30. The second memory, accessible only to display 35, is dedicated to storing data decrypted using decryption key 100.

The second memory of firmware memory 120 is not accessible to client computer 30. In one embodiment, firmware memory 120 may include a software or hardware-based network security system such as a firewall protecting the second memory. Because the second memory of firmware memory 120 cannot be accessed by software installed on client computer 30, the decrypted data stored in the second memory of firmware memory 120 cannot be accessed by spyware and/or malware threats that may exist on client computer 30. In another embodiment, spyware and/or malware threats that may exist on client computer 30 are not transmitted over the display channel that connects client computer 30 to display 35.

Figure 2:
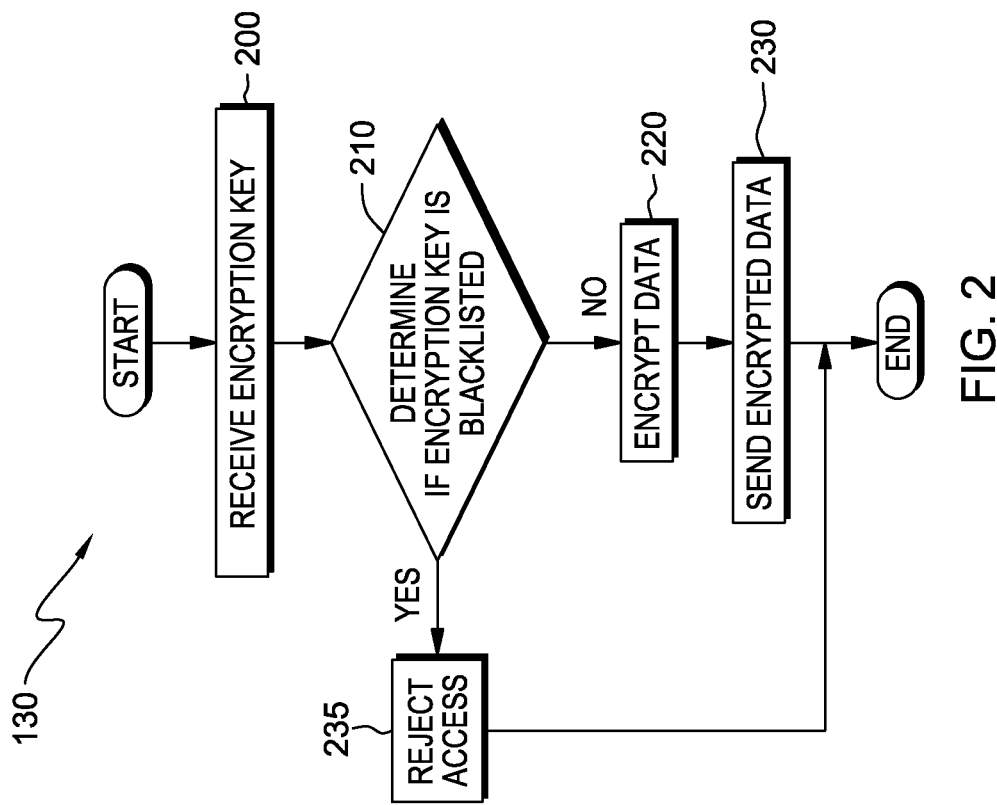
FIG. 2 is a flowchart depicting operational steps of a secure resource, executing within a server computer of the distributed data processing environment of FIG. 1, for encrypting data and sending encrypted data, in accordance with an embodiment of the present invention.

FIG. 2 depicts a flowchart of the steps of secure resource 130 for encrypting data and sending encrypted data to secure info client program 60, in accordance with an embodiment of the present invention.

Initially, a user at client computer 30 requests access to secure resource 130 in order to access confidential data or information. In one embodiment, when the user attempts to access secure resource 130 via secure resource interface 50, secure client info program 60 sends instructions to decryption firmware 110 to send encryption key 90 to secure resource 130. In an alternate embodiment, the user includes encryption key 90 in the request for confidential data from secure resource 130.

In step 200, secure resource 130 receives encryption key 90, in addition to a request for data. In the preferred embodiment, secure resource 130 receives encryption key 90 directly from decryption card 80 over the network. In another embodiment, decryption card 80 sends encryption key 90 to secure info client program 60, and secure info client program sends encryption key to secure resource 130 over the network.

Secure resource 130 determines if encryption key 90 is black listed (decision 210). In one embodiment, secure resource 130 accesses encryption key database 140 to determine if the identification information for encryption key 90 is included in encryption key database 140. If the identification information for encryption key 90 is included in encryption key database 140, secure resource 130 determines that decryption card 80 is not black listed and encryption key 90 is valid (decision 210, "No" branch). A valid encryption key is, for example, an encryption key with identifying information in encryption key database 140. Secure resource 130 encrypts the requested data (step 220).

In step 220, secure resource 130 encrypts the data requested by the user. In one embodiment, secure resource 130 encrypts all of the data. In another embodiment, when secure resource 130 determines only a portion of the data is confidential, secure resource 130 encrypts only the confidential portion of the data. In yet another embodiment, secure resource 130 includes a timestamp within the encrypted data. If the encrypted data includes a timestamp, decryption card 80 may distinguish data sent in real time from recorded data. In one embodiment, encryption key 90 encrypts all data sent by secure resource 130 to secure info client program.

In step 230, secure resource 130 sends the encrypted data to secure info client program 60 over the network, such as network 20 in environment 10, and processing ends.

If the identification information for encryption key 90 is not included in encryption key database 140, secure resource 130 determines decryption card 80 is black listed and encryption key 90 is not valid (decision 210, "Yes" branch). Secure resource 130 then rejects access to secure resource 130 (step 235) and processing ends.

Figure 3:
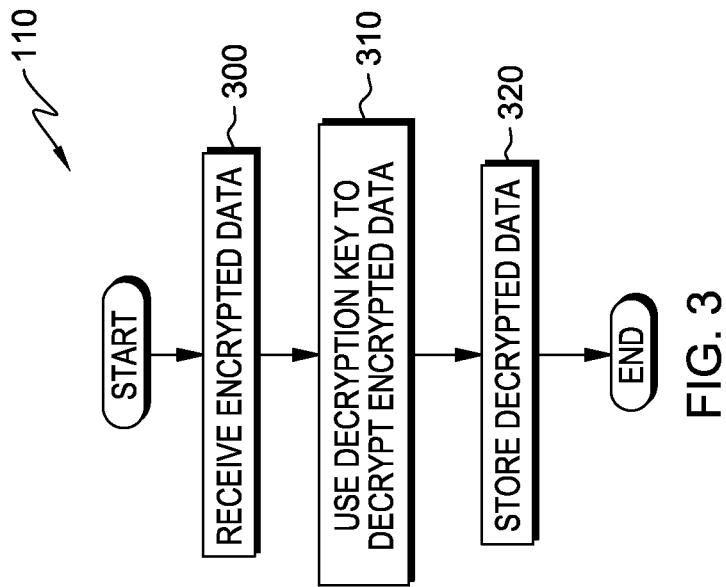
FIG. 3 is a flowchart depicting operational steps of a decryption firmware, executing from within a client computer of the distributed data processing environment of FIG. 1, in accordance with an embodiment of the present invention.

FIG. 3 is a flowchart of the steps of decryption firmware 110, on decryption card 80, for decrypting data encrypted by encryption key 90, in accordance with one embodiment of the present invention.

In step 300, decryption firmware 110 receives encrypted data via secure info client program 60. In one embodiment, after receiving the encrypted data over the network from secure resource 130, secure info client program 60 sends the encrypted data to decryption card 80, via the display channel connecting client computer 30 and display 35, where it is stored in firmware memory 120. In the preferred embodiment, the encrypted data is stored in the first part of firmware memory 120, which is accessible to client computer 30.

In step 310, decryption firmware 110 uses decryption key 100 to decrypt the encrypted data. Decryption key 100 decrypts the encrypted data. Decryption key 100 is the only private key capable of decrypting data encrypted by encryption key 90. If decryption key 100 is not associated with encryption key 90, decryption firmware 110 will not decrypt the data. Decryption firmware 110 stores the decrypted data in the second part of firmware memory 120. In one embodiment, a mathematical relationship, such as a discrete logarithm, is used to decrypt the encrypted data.

In step 320, decryption firmware 110 stores the decrypted data on display 35. In one embodiment, decryption firmware 110 stores the decrypted data on the second part of firmware memory 120. The decrypted data is stored in the second part of firmware memory 120 and is only accessible to display 35. The second part of firmware memory 120 and the decrypted data are protected from any spyware and/or malware that may exist on client computer 30. In one embodiment, firmware memory 120 includes a software or hardware-based network security system such as a firewall protecting the second memory.

Decryption firmware 110 may also display the decrypted data on display 35. In one embodiment, the decrypted data is displayed in video form.

Figure 4:
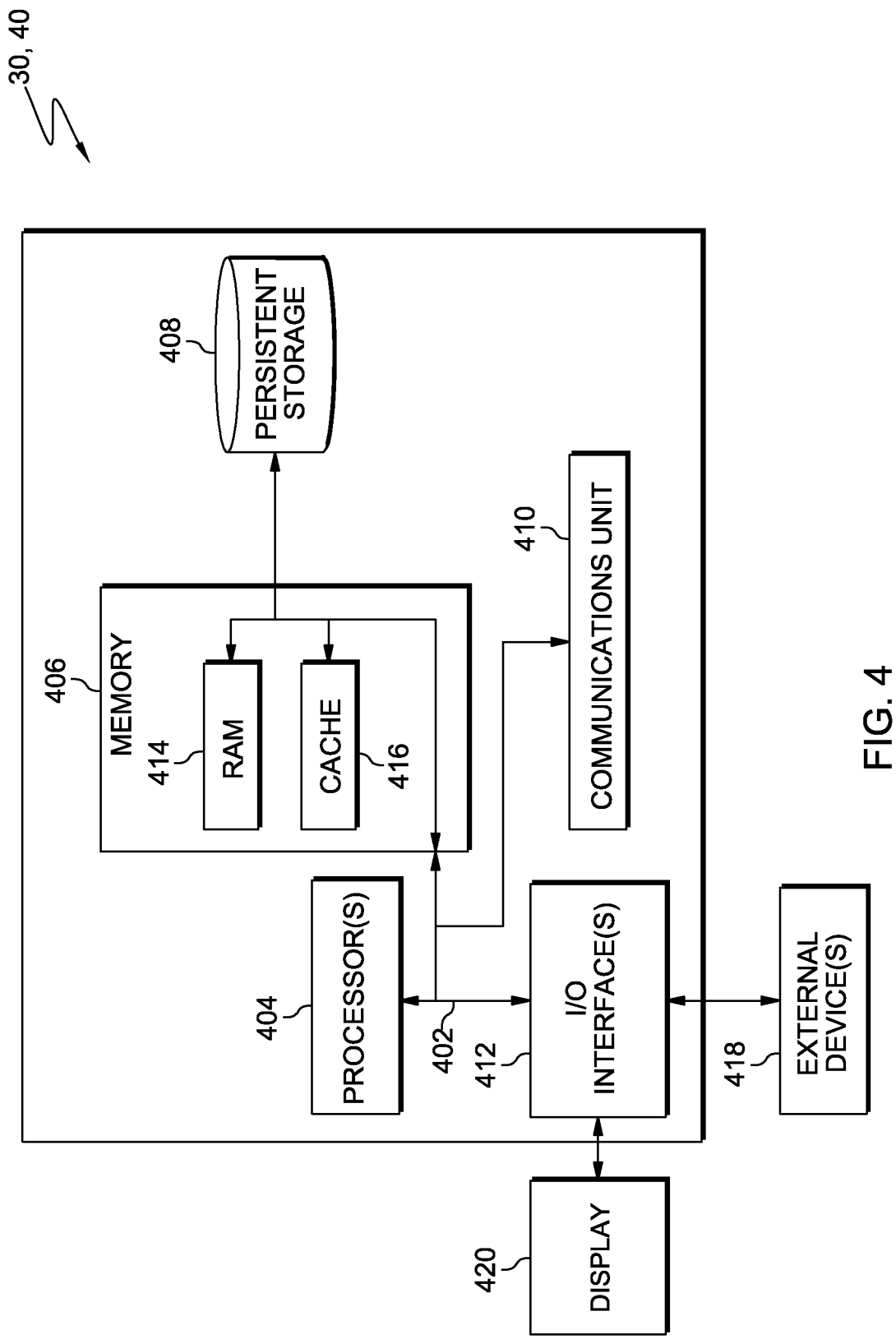
FIG. 4 depicts a block diagram of components of the server computer or client computer of FIG. 1, in accordance with one embodiment of the present invention.

FIG. 4 depicts a block diagram of components of server computer 40 or client computer 30, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computer 30 or server computer 40 can each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Secure resource interface program 50 and secure info client program 60 are stored in persistent storage 408 of client computer 30 for execution by one or more of the respective computer processors 404 via one or more memories of memory 406 of client computer 30. Secure resource 130 and encryption key database 140 are stored in persistent storage 408 of server computer 40 for execution and/or access by one or more of the respective computer processors 404 of server computer 40 via one or more memories of memory 406 of server computer 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 408 may also be removable. For example, a removable hard drive may be used for persistent storage 408. Other examples include optical and magnetic disks, thumb drives, and smart cards inserted into a drive for transfer onto another computer-readable storage medium that is also part of persistent storage 408.

Communications unit 410, in these examples, provides for communications with other servers or devices. In these examples, communications unit 410 includes one or more network interface cards. Communications unit 410 may provide communications through the use of either or both physical and wireless communications links. Secure resource interface program 50 and secure info client program 60 may be downloaded to persistent storage 408 of client computer 30, respectively, through the respective communications unit 410. Secure resource 130 and encryption key database 140 may be downloaded to persistent storage 408 of server computer 40 through communications unit 410 of server computer 40.

I/O interface(s) 412 allows for input and output of data with other devices that may be connected to client computer 30 or server computer 40. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., secure info client program 60, can be stored on such portable computer-readable storage media and can be loaded onto persistent storage 408 of client computer 30, respectively, via the respective I/O interface(s) 412 of client computer 30. Software and data used to practice embodiments of the present invention, e.g., secure resource 130, can be stored on such portable computer-readable storage media and can be loaded onto persistent storage 408 of server computer 40 via I/O interface(s) 412 of server computer 40. I/O interface(s) 412 may also connect to a display 35. In one embodiment, I/O interface(s) 412 may connect to the display 35 via a display channel, such as an HDMI cable.

Display 35 provides a mechanism to display data to a user and may be, for example, a computer monitor. Display 35 is an electronic visual display that is directly connected to client computer 30. Display 35 comprises the display device and circuitry. Display 35 may be a thin film transistor liquid crystal display (TFT-LCD) thin panel, cathode ray tube (CRT), or any other type of monitor capable of displaying data from client computer 30. Display 35 may contain decryption card 80.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for protecting data with an electronic card device containing a first memory and a second memory, connected to a display device that is connected to a computer by a display channel, the method comprising the steps of:
the electronic card device receiving encrypted data, the encrypted data encrypted by a valid encryption key;
the electronic card device storing the encrypted data in the first memory, wherein the first memory is accessible to the display device and the computer;
the electronic card device decrypting the encrypted data using a decryption key, wherein the electronic card device causes the decrypted data to display on the display device; and
the electronic card device storing the decrypted data in the second memory, wherein the second memory is only accessible to the display device.

2. The method of claim 1, wherein a valid encryption key is an encryption key with an identification number included in a database, maintained by a manufacturer of the encryption key.

3. The method of claim 1, wherein the valid encryption key and the decryption key are mathematically linked, the decryption key capable of decrypting data encrypted by the valid encryption key.

4. The method of claim 3, wherein the encrypted data is encrypted by the valid encryption key on a second computer.

5. A system for protecting data, the system comprising:
a computer;
a display device coupled to the computer by a display channel; and
an electronic card device, containing a first memory and a second memory, connected to the display device;
the electronic card device operated to:
receive encrypted data, the data encrypted using a valid encryption key;
store the encrypted data in the first memory, wherein the first memory is accessible to the display device and the computer;
decrypt the encrypted data using a decryption key, wherein the electronic card device causes the decrypted data to display on the display device; and
store the decrypted data in the second memory, wherein the second memory is only accessible to the display device.

6. The computer system of claim 5, wherein a valid encryption key is an encryption key with an identification number included in a database, the database maintained by a manufacturer of the encryption key.

7. The computer system of claim 5, wherein the valid encryption key and the decryption key are mathematically linked, the decryption key capable of decrypting data encrypted by the valid encryption key.

8. The computer system of claim 7, wherein the encrypted data is encrypted by the valid encryption key on a second computer.

9. A computer program product for protecting data, the computer program product comprising:
- one or more computer-readable storage media and program instructions stored on the one or more computer-readable storage media, the program instructions comprising:
- program instructions to receive encrypted data, the data encrypted using a valid encryption key;
- program instructions to store the encrypted data in the first memory, wherein the first memory is accessible to the display device and the computer;
- program instructions to decrypt the encrypted data using a decryption key, wherein the electronic card device causes the decrypted data to display on the display device; and
- program instructions to store the decrypted data in the second memory, wherein the second memory is only accessible to the display device.

10. The computer program product of claim 9, wherein a valid encryption key is an encryption key with an identification number included in a database, the database maintained by a manufacturer of the encryption key.

11. The computer program product of claim 9, wherein the valid encryption key and the decryption key are mathematically linked, the decryption key capable of decrypting data encrypted by the valid encryption key.

* * * * *